US007860858B2

(12) United States Patent
Brown et al.

(10) Patent No.: US 7,860,858 B2
(45) Date of Patent: Dec. 28, 2010

(54) CLOSED-LOOP PREDICATE ANALYSIS

(75) Inventors: Douglas P. Brown, Rancho Santa Fe, CA (US); Anita Richards, San Juan Capistrano, CA (US); Bhashyam Ramesh, Secunderabad (IN)

(73) Assignee: Teradata US, Inc., Dayton, OH (US)

( * ) Notice: Subject to any disclaimer, the term of this patent is extended or adjusted under 35 U.S.C. 154(b) by 1359 days.

(21) Appl. No.: 11/328,702

(22) Filed: Jan. 10, 2006

(65) Prior Publication Data
US 2007/0162426 A1   Jul. 12, 2007

(51) Int. Cl.
*G06F 17/30* (2006.01)
*G06Q 99/00* (2006.01)

(52) U.S. Cl. .................... 707/713; 705/1.1; 705/400; 707/2

(58) Field of Classification Search .............. 705/1.1, 705/400; 707/1–10, 101, 200, 713
See application file for complete search history.

(56) References Cited

U.S. PATENT DOCUMENTS

| 5,734,884 | A * | 3/1998 | Eberhard et al. ............. 1/1 |
| 6,026,391 | A * | 2/2000 | Osborn et al. ............... 1/1 |
| 6,330,552 | B1 * | 12/2001 | Farrar et al. ................ 705/400 |
| 6,493,700 | B2 * | 12/2002 | Couch et al. ................ 707/2 |
| 6,801,905 | B2 * | 10/2004 | Andrei ....................... 1/1 |
| 6,983,275 | B2 * | 1/2006 | Koo et al. .................. 1/1 |
| 2002/0198867 | A1 * | 12/2002 | Lohman et al. ............. 707/3 |
| 2004/0220923 | A1 * | 11/2004 | Nica ......................... 707/3 |
| 2006/0041599 | A1 * | 2/2006 | Tsuchida et al. ............ 707/200 |

OTHER PUBLICATIONS

Selinger et al., "Access Path Selection In a Relational Database", 1979, IBM Research Division, pp. 23-34.*
Mackert et al., "R* Optimizer Validation and Performance Evaluation for Local Queries", IBM Almaden Research Center, 1986, pp. 84-95.*
He et al., "Self-Tuning Modeling of User-Defined Functions in an Object-Relational DBMS", Sep. 2005, ACM Transactions on Database Systems, vol. 30, No. 3, pp. 812-853.*

* cited by examiner

*Primary Examiner*—John W Hayes
*Assistant Examiner*—Freda A Nelson
(74) *Attorney, Agent, or Firm*—Howard Speight

(57) ABSTRACT

Processing of a request is optimized. The request has one or more predicates. A list of the one or more predicates in the request is created and predicates for which an actual cost has not been stored or for which a cost cannot be estimated are pruned from the list. An access path for the each of the predicates is selected. The request is processed using the selected access paths producing one or more actual predicate costs. The one or more actual predicate costs are stored.

33 Claims, 9 Drawing Sheets

CLOSED-LOOP PREDICATE ANALYSIS

CROSS-REFERENCE TO RELATED APPLICATIONS

This application is related to U.S. patent application Ser. No. 10/730,629, entitled "Closed-Loop Estimation of Request Costs," by Douglas P. Brown and Bhashyam Ramesh, filed on Dec. 8, 2003, which issued as U.S. Pat. No. 7,647,280.

BACKGROUND

A database management system is accessed and managed through sessions "requests." A request can be a query, through which the database is accessed, or an instruction to execute a utility, such as a load command. Most database management systems use an optimizer to select an access plan, or query execution plan, for a database request and most optimizers rely on a cost model, where cost is associated with the amount of a resource, such as CPU or I/O, that must be devoted to a task, to choose the best access plan to execute any given request. Most cost models rely on a mathematical construct that uses estimates of the numbers of rows (cardinalities) which will result at each step of the access plan. The estimates are often based on assumptions regarding the contents of the database tables.

SUMMARY

In general, in one aspect, the invention features a method for optimizing processing of a request. The request has one or more predicates. The method includes creating a list of the one or more predicates in the request and pruning from the list the predicates for which an actual cost has not been stored or for which a cost cannot be estimated. The method further includes selecting an access path for each of the predicates, processing the request using the selected access paths, producing one or more actual predicate costs, and storing the one or more actual predicate costs.

Implementations of the invention may include one or more of the following. Selecting an access path for each of the predicates may include accessing a data dictionary. The method may further include using a data dictionary when selecting the access path for each of the one or more predicates and updating the data dictionary using the one or more actual predicate costs. The method may further include comparing a stored predicate actual cost with an estimated predicate cost and calculating an adjustment factor that will be used to adjust the estimated predicate cost in future processing. Selecting the access path may include using the actual predicate cost, if available, and otherwise using the estimated predicate cost. Selecting the access path may include using the estimated predicate cost even if an actual predicate cost is available, if the actual predicate cost is unreliable. The actual predicate cost may be unreliable if one or more of the following conditions is true: the actual predicate cost is obsolete, or the actual predicate cost is empty. When pruning the predicate list the actual cost may be accessed from the data dictionary. The request may be associated with a workload and creating the list may further include including in the list predicates from other requests associated with the workload. Pruning the list may include using actual statistics to determine the actual cost, if actual statistics are available and otherwise using estimated statistics to determine an estimated cost. Pruning the list may include deriving the actual cost of the predicate or predicates in the list by running the predicate or predicates in the list through an optimizer and storing statistics produced by the optimizer in running the predicate or predicates.

In general, in another aspect, the invention features a computer program, stored on a tangible storage medium, for use in optimizing processing of a request. The request has one or more predicates. The program includes executable instructions that cause a computer to create a list of the one or more predicates in the request, prune from the list the predicates for which an actual cost has not been stored or for which a cost cannot be estimated, select an access path for the each of the predicates, process the request using the selected access paths, producing one or more actual predicate costs, and store the one or more actual predicate costs.

In general, in another aspect, the invention features a database system. The database system includes a massively parallel processing system, which includes one or more nodes, a plurality of CPUs, each of the one or more nodes providing access to one or more CPUs, a plurality of data storage facilities, each of the one or more CPUs providing access to one or more data storage facilities, and a process for optimizing processing of a request, the request having one or more predicates. The process includes creating a list of the one or more predicates in the request.

pruning from the list the predicates for which an actual cost has not been stored or for which a cost cannot be estimated, selecting an access path for the each of the predicates, processing the request using the selected access paths, producing one or more actual predicate costs, and storing the one or more actual predicate costs.

DETAILED DESCRIPTION

Figure 1:
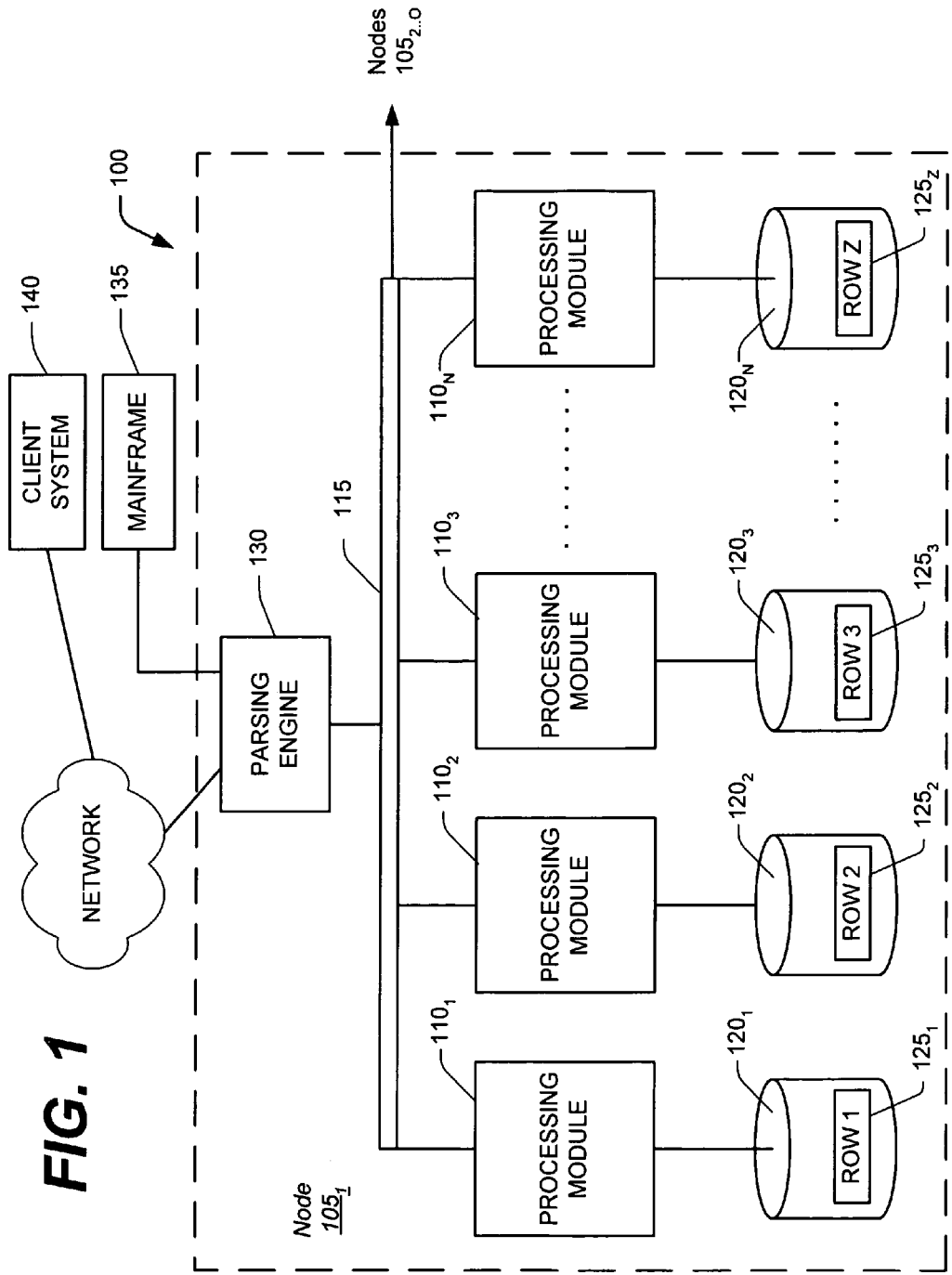
FIG. 1 is a block diagram of a node of a database system.

The closed-loop technique for estimating the cost to execute requests disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_1 \ldots {_N}$, connected by a network 115, that manage the storage and retrieval of data in data-storage facilities $120_1 \ldots {_N}$. Each of the processing modules $110_1 \ldots {_N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
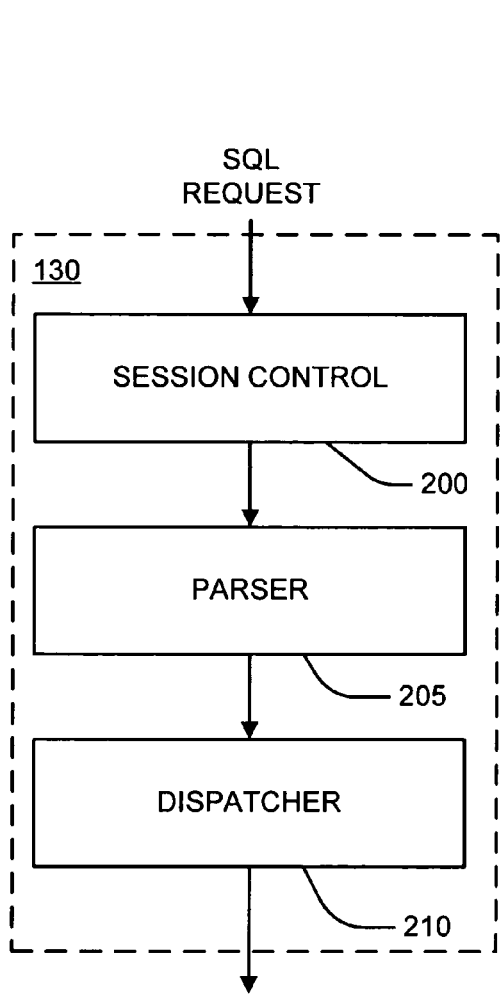
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
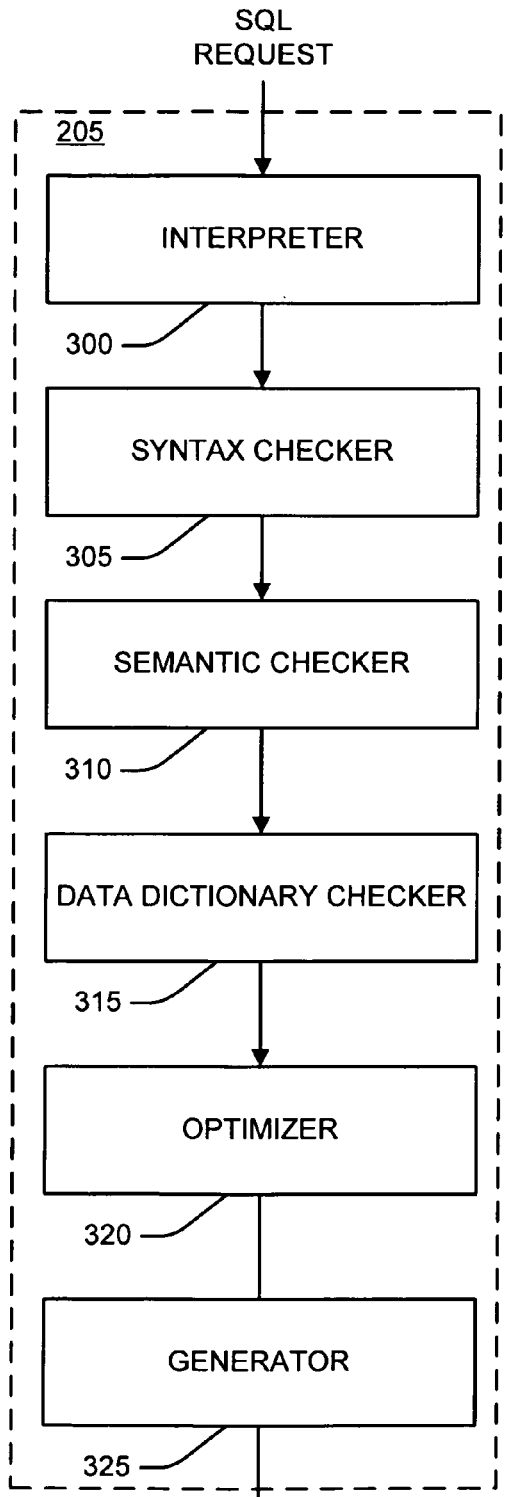
FIG. 3 is a block diagram of a parser.

Once the session control 200 allows a session to begin, a user may submit a SQL request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). The parser 205 runs an optimizer (block 320), which develops the least expensive plan to perform the request. Finally, a generator (block 325) generates the steps to be executed.

Figure 4:
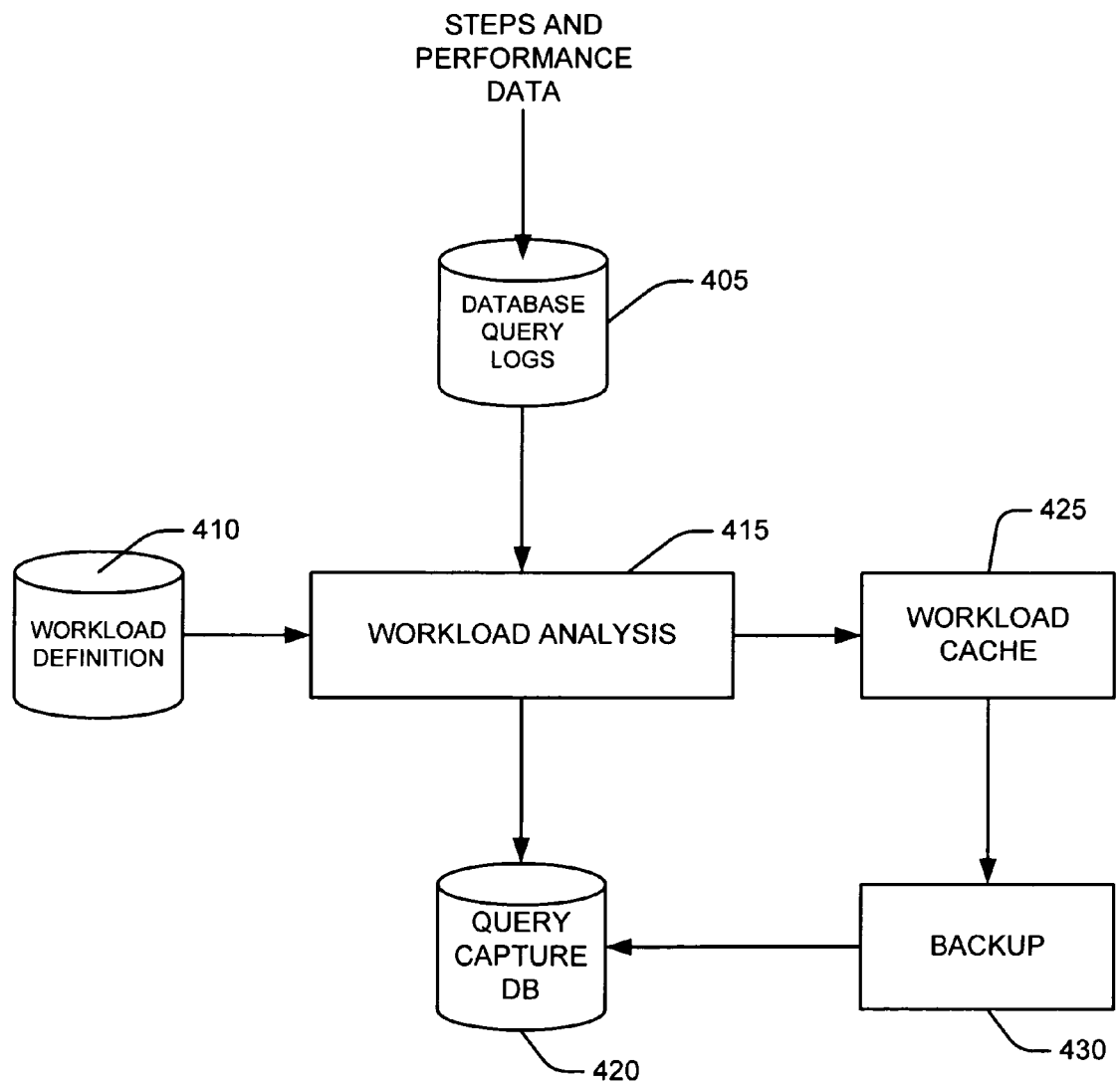
FIG. 4 is a block diagram of a system to capture information regarding request processing.

As illustrated in FIG. 4, the steps generated for queries and other requests, and statistics regarding system performance for those steps, are stored in one or more database query logs 405. The system may include a single database query log 405 or it may include multiple database query logs. For example, each user may be assigned his/her own database query log. Similarly, each workload group (defined below) may be assigned its own database query log. Further, even if the database query log is a single log, it may be organized by user or by workload groups.

Queries and other requests are sorted into sets (i.e., classes of queries) known as "workload groups" (or, interchangeably, "workload definitions" or "WDs") having, for example, similar performance expectations. For example, the system may define service level goals (SLGs) for each workload group which are used to monitor and adjust the performance of the system, as described in co-pending U.S. patent application Ser. No. 10/730,629, entitled Administering the Workload of a Database System Using Feedback, by Douglas P. Brown, Anita Richards, Bhashyam Ramesh, Caroline M. Ballinger, and Richard D. Glick, filed on Dec. 8, 2003, which issued as U.S. Pat. No. 7,395,537, incorporated by reference. The service level goals, the association of requests with workloads, and other workload information, are stored in a workload definition database 410.

A workload analysis process 415 retrieves performance information from the database query logs 405 and stores it in a query capture database (QCD) 420. Alternatively, the system stores the performance information in a workload cache 425. In one example system, the cache is sorted by workload groups, which means that performance information can be accessed quickly if an identifier for the workload group is known. The workload analysis process 415 may be a manual process or it may be automatic. The process may be performed off-line, e.g., at night, or it may be performed in real time.

The information from the workload cache 425 is backed up (block 430) to the QCD periodically or when the cache is full or when another condition related to the process about to be described occurs. The result is that the QCD 420 contains actual cost information for query steps that have been executed by the system. This workload analysis may be performed for all workload groups or for only selected workload groups. In addition, estimated cost information is also stored in the QCD 420, which means that before run-time and after run-time query cost information is stored in the QCD. The actual and estimated cost information is stored in normalized form in a number of tables in the QCD. The normalization facilitates analysis of the data. The database query logs 405 also contain actual cost information, but it is typically not normalized.

Included in the actual cost information stored in the QCD is the cost of processing identified predicates using identified access paths to access relations referenced in requests (e.g., a tables). An example of a predicate is found in the WHERE clause of a SQL statement. For example, in the SQL statement:

SELECT*WHERE table1.name='Anita';

the single predicate is "table1.name='Anita'". In this example, the relation referenced in the predicate is "table1". A request may have multiple predicates and the predicates themselves can take a variety of forms, as is known in the art.

An access path to a relation is a method for retrieving information from the relation. Each relation may have several access paths. For example, a particular relation may have the following access paths:

all_access_ok: a relation with this access path can be scanned using any of the access paths defined on the table, including those listed below.

nu2nd_access_ok: a relation with this access path can only be scanned using a non-unique secondary index.

pk_access_ok: a relation with this access path can only be scanned using a unique primary index.

seq_access_ok: a relation with this access path can only be scanned sequentially.

When planning access to a single relation as part of an overall plan for processing a request, the optimizer 320 costs all of the available access plans and identifies the index ID of the cheapest access path.

A predicate that references a relation may be executed using any of the access paths for that relation. The database query logs store actual performance statistics (also called "actual costs") for predicates that have been executed using the different access paths for the relations referenced in the predicates. Herein, costs refer to the resources that a request consumes. For example, a request may cost 100 CPU-seconds, 100,000,000 input/outputs (I/O's), 2 hours of actual elapsed time, spool consumption of 10 billion rows, etc. The collection and accuracy of such database statistics plays an important role in the accuracy and optimization of the execution of a query or request.

Figure 5:
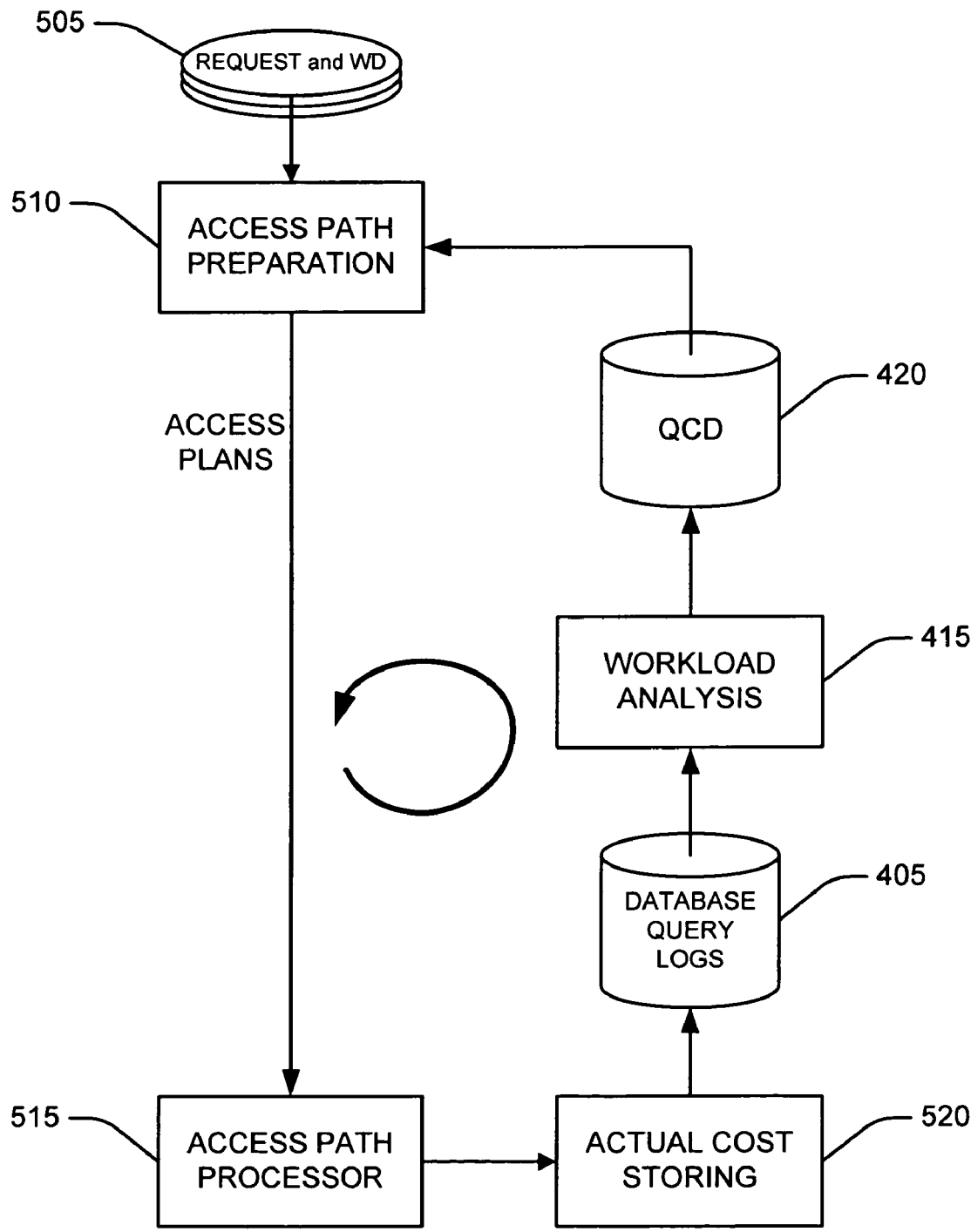
FIGS. 5-10 are flow charts for closed-loop processes to estimate the cost of executing requests.

As illustrated in FIG. 5, the system uses the actual costs stored in the QCD 420 to improve the operation of the optimizer 320. As shown in FIG. 5, a request or requests and associated workload definition information is presented to an access preparation block 510, which identifies all Qf the predicates and associated access paths for each of the requests to be executed, along with the cost associated with the predicates and associated access paths. In making these identifications, for at least some workgroups (or workload definitions or WIs), the access preparation block 510 takes into account the actual cost information stored in the QCD 420.

The set of predicates and associated access plans is presented to an access plan processor (block 515) which uses predetermined criteria (such as total cost) to select an access plan for each predicate from among the available access plans for each predicate. The access path processor 515 then executes the predicates using the selected access plans and collects actual cost information as each of the predicates is executed. The actual cost information is stored (block 520) in the database query logs 405. The actual cost information is analyzed (block 420) and stored in the QCD 420 or in the workload cache 425 shown in FIG. 4, as discussed above. Thereafter, actual cost information is available for use in determining the cost of performing identified predicates using identified access plans. In one example system, the actual cost information is only available for workload groups (or workload definitions) for which such analysis has been selected and is not available for other workload groups (or workload definitions).

As shown by the arrowed circle in FIG. 5, the access path processing forms a feedback loop. The actual cost of processing different access paths is used to adjust the estimates of the same cost made by the optimizer.

Figure 6:
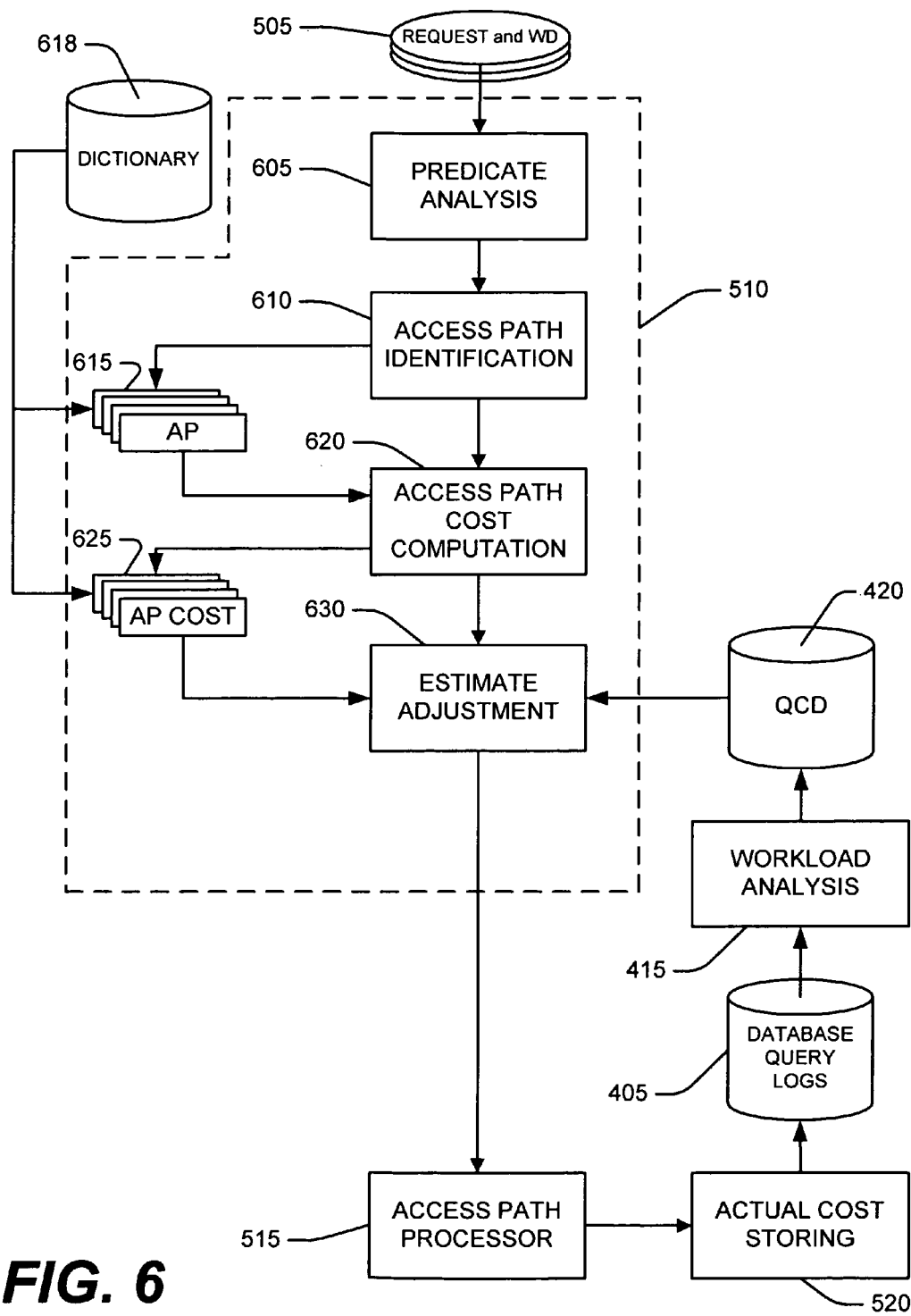

The access plan preparation block, shown in more detail within the dotted lines in FIG. 6, begins with predicate analysis (block 605). Predicates are sometimes called conditions, or in this application, request elements. In one example system, the predicate analysis process 510 generates an ANDED list of predicates that have been specified in, for example, the WHERE clause of a SQL SELECT statement. The ANDED predicate list may be pruned, for example, to exclude predicates for which a cost cannot be estimated. The predicate analysis process is similar to that described in as described in co-pending U.S. patent application Ser. No. 09/977,038, entitled "Index Selection in a Database System," by Douglas P. Brown, Jeetendra Chaware, and Manjula Koppuravuri, filed on Oct. 12, 2001, incorporated by reference.

The ANDED predicate list is used to build (block 610) a list of predicates and associated access paths 615. A list of access paths for each relation and other information useful for this analysis is stored in a dictionary 618. A cost estimate 625 is computed (block 620) for each access path for each of the predicates using information stored in the dictionary 618. The estimated cost is adjusted (block 630) using the actual cost information stored in the QCD (or in the workload cache 425), if the actual cost information exists. Processing then continues as described above with respect to FIG. 5.

The estimate adjustment process 630 may be invoked for all predicates and access paths associated with all received requests or it may be invoked more selectively. In one example system, the estimate adjustment process is only invoked for access paths associated with requests belonging to a selected workload group or groups. Access paths associated with requests belonging to non-selected workload groups would not have their estimated access path costs adjusted and would instead use the access path costs stored in location 625.

Figure 7:
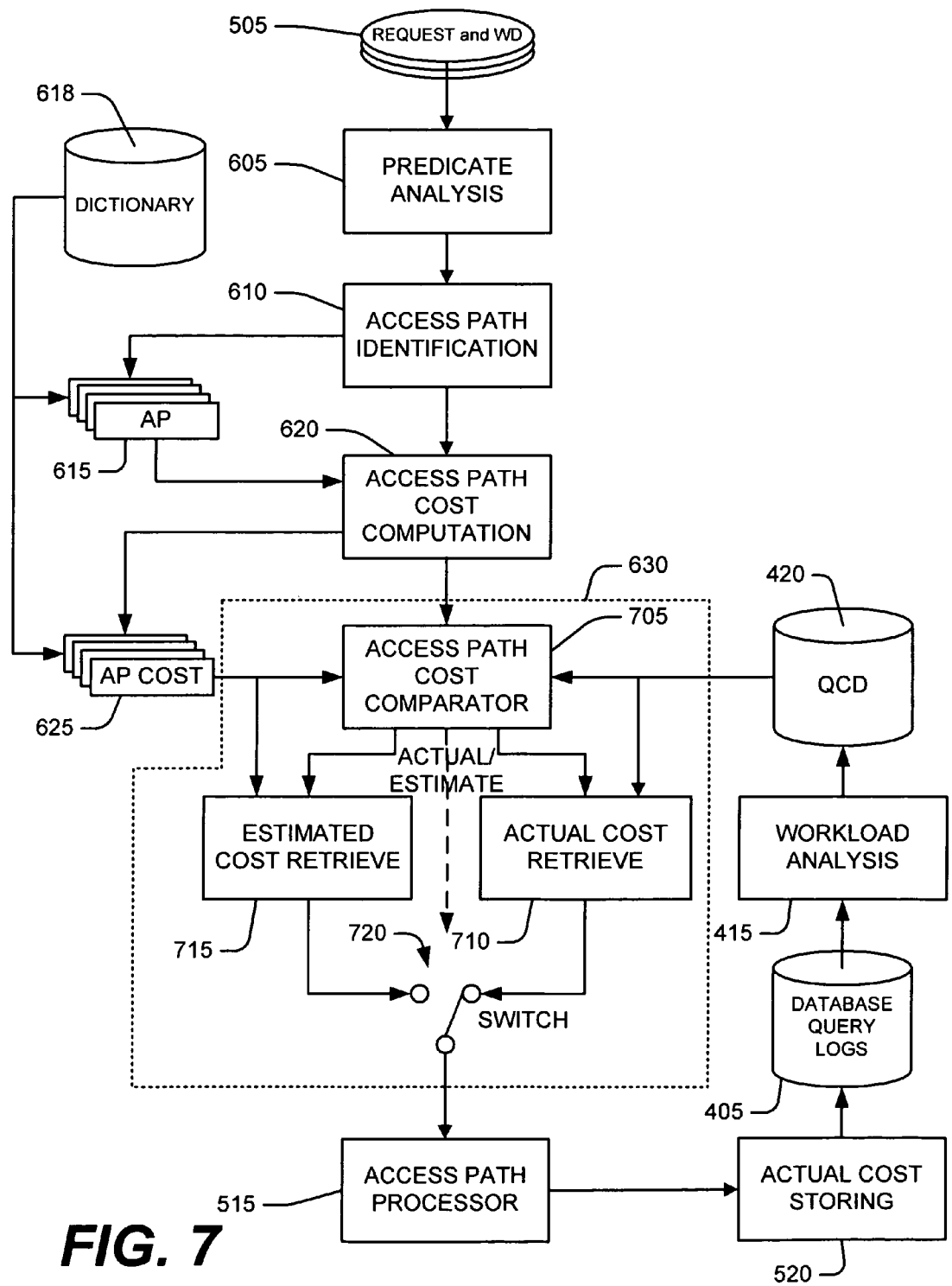

An example process for adjusting the cost estimates (block 630), illustrated in FIG. 7, compares the estimated access path costs 625 with the actual access path costs stored in the QCD 420 or workload cache 425, if they exist (block 705). In one example system, the access path cost comparator (block 705) determines if an actual path for a particular access path is stored in the QCD. If so, the system uses the actual cost rather than the estimated cost. As shown in FIG. 7, if an actual cost exists it is retrieved from the QCD (block 710). Otherwise, the estimated cost is retrieved (block 715) from the list of estimated costs. The selection between the estimated access cost and the actual access cost is represented by a switch 720, which is driven by a actual/estimated signal from the access path cost comparator (block 705).

In another example system, the access path cost comparator (block 705) determines if an actual path belonging to a WD (e.g., "tactical" workload) for a particular access path is stored in the QCD. If so, the system uses the actual statistics captured in the QCD rather than using "Random AMP Samples" or estimates. Similar to that shown in FIG. 7, if an actual statistics recommendation exists, it is retrieved from the QCD (block 710). Otherwise, the estimated statistics (e.g., Random AMP Samples) are retrieved (block 715) from the list of estimated statistics.

As an example of how actual statistics may be gathered, an example system would perform the following steps:

1. Select the SQL statements for which statistics are to be gathered;
2. Run the selected SQL statements using an "insert explain" syntax to save the resulting statistics into a table in the QCD. Alternatively, the selected SQL statements may be run against the database using a sample-reading technique such as that described in U.S. Pat. No. 6,801, 903, entitled "Collecting Statistics in a Database," to Douglas P. Brown and Jeetendra Chaware, issued Oct. 5, 2004. Under such technique, only a sample of rows in a table are scanned instead of the full table. Often, this reduces the amount of time necessary to collect the statistics;
3. Remove any duplicates in the QCD table storing the statistics.

An example of an "insert explain" syntax is shown below:
insert explain into <name of QCD table> check statistics
SELECT . . .
FROM . . .
WHERE . . .
GROUP BY . . .
ORDER BY . . . ;

where the SELECT, FROM, WHERE, GROUP BY, and ORDER BY clauses match the SQL statements being evaluated. As a result of running this request, the QCD table named in the request will contain the statistics for the SQL statements being evaluated. After duplicates are removed from the QCD table it will hold a reliable and up to date set of statistics. As can be seen, the statistics are evaluated using the optimizer 320.

Once the statistics are selected, processing proceeds as described with respect to FIGS. 5 and 6. As mentioned above, the process shown within the dashed lines in FIG. 7 may be performed for all of the access plans or it may only be performed with respect to certain access plans associated with predicates that are part of requests assigned to selected workload groups.

Figure 8:
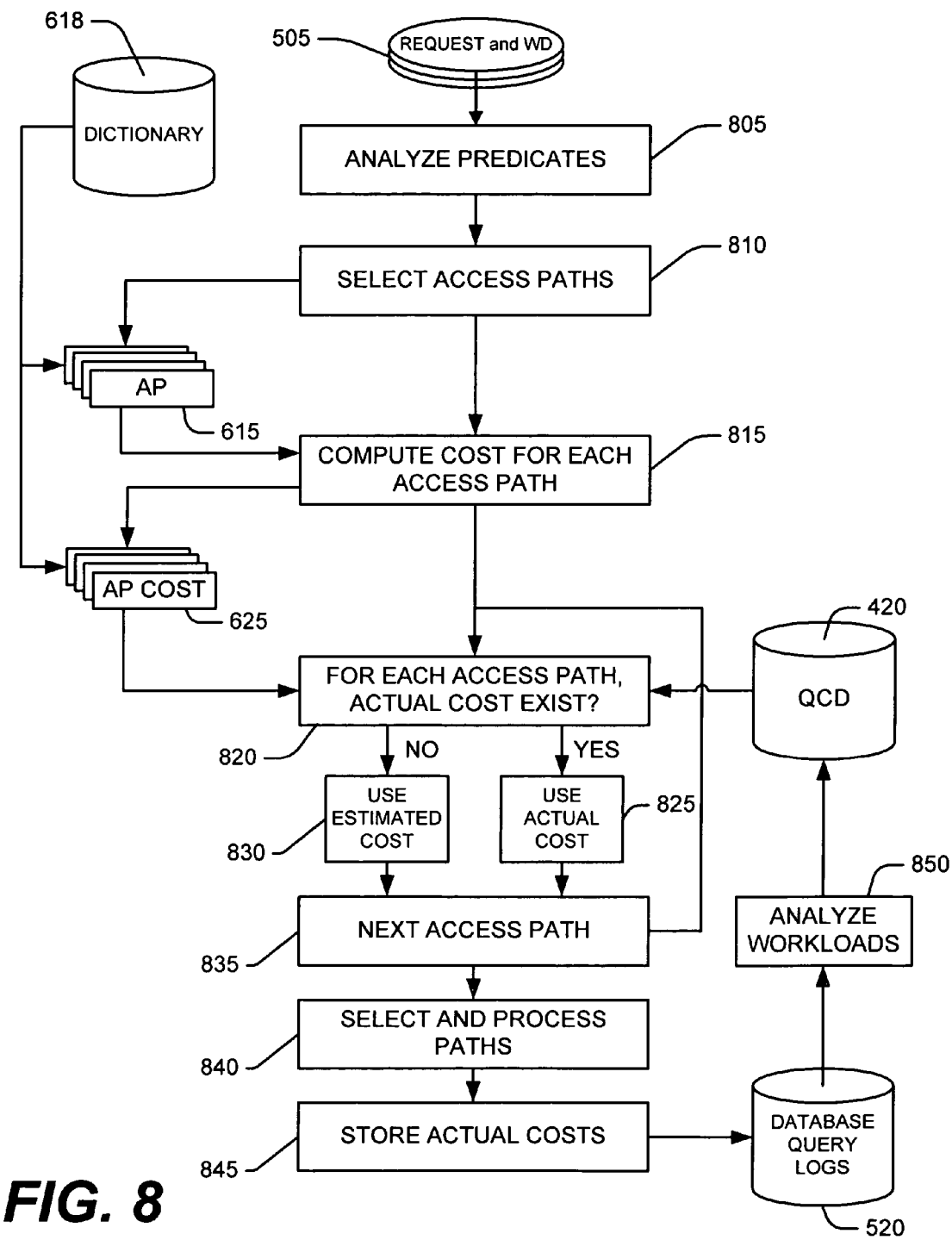

In operation, as shown in FIG. 8, a request (or several requests 505) are analyzed to identify their associated predicates (block 805). In addition, the request is analyzed to determine which workload definition it belongs to. The predicates are analyzed, using information stored in the dictionary 618 to identify access paths for each predicate (block 810). The identified access paths and their associated predicates are stored in a list 615. A cost is estimated for each access path (block 815). The costs are stored in another list 625.

The estimated costs are then adjusted. For each access path, the system determines if the QCD 420 contains an actual cost (block 820). If so, the actual cost is used (block 825). Otherwise, the estimated cost is used (block 830). The system then moves to the next access path (block 835), returning to block 820. Once again, this process may be performed selectively, as described above.

Once the system has adjusted the cost for each of the access paths, it selects, using a predetermined criteria (such as lowest cost) a single access path for each predicate from among the access paths available for each predicate (block 840). It then processes and monitors the actual cost of each of the access paths (block 840). The system stores the actual costs in the database query logs 520 (block 845). Finally, the system analyzes the workloads 850 and stores the results in the QCD 420 (block 850). The process of analyzing the workloads 850 may be accomplished using the "insert explain" syntax set out above. This process employs the Teradata Index Wizard technology described in U.S. Pat. No. 6,801,903, entitled "Collecting Statistics in a Database," to Douglas P. Brown and Jeetendra Chaware, issued Oct. 4, 2004.

As can be seen in FIG. 8, the system has two loops, one nested inside the other. The first loop, including blocks 820, 825, 830 and 835, selects an actual cost or an estimated cost for each of the access paths. The second loop, which includes each of the elements of the first loop and elements 840, 845, 520, 850 and 415, determines an adjusted estimated cost for each of the access paths. The second loop provides feedback which has the capability of improving the performance of the optimizer 320.

Figure 9:
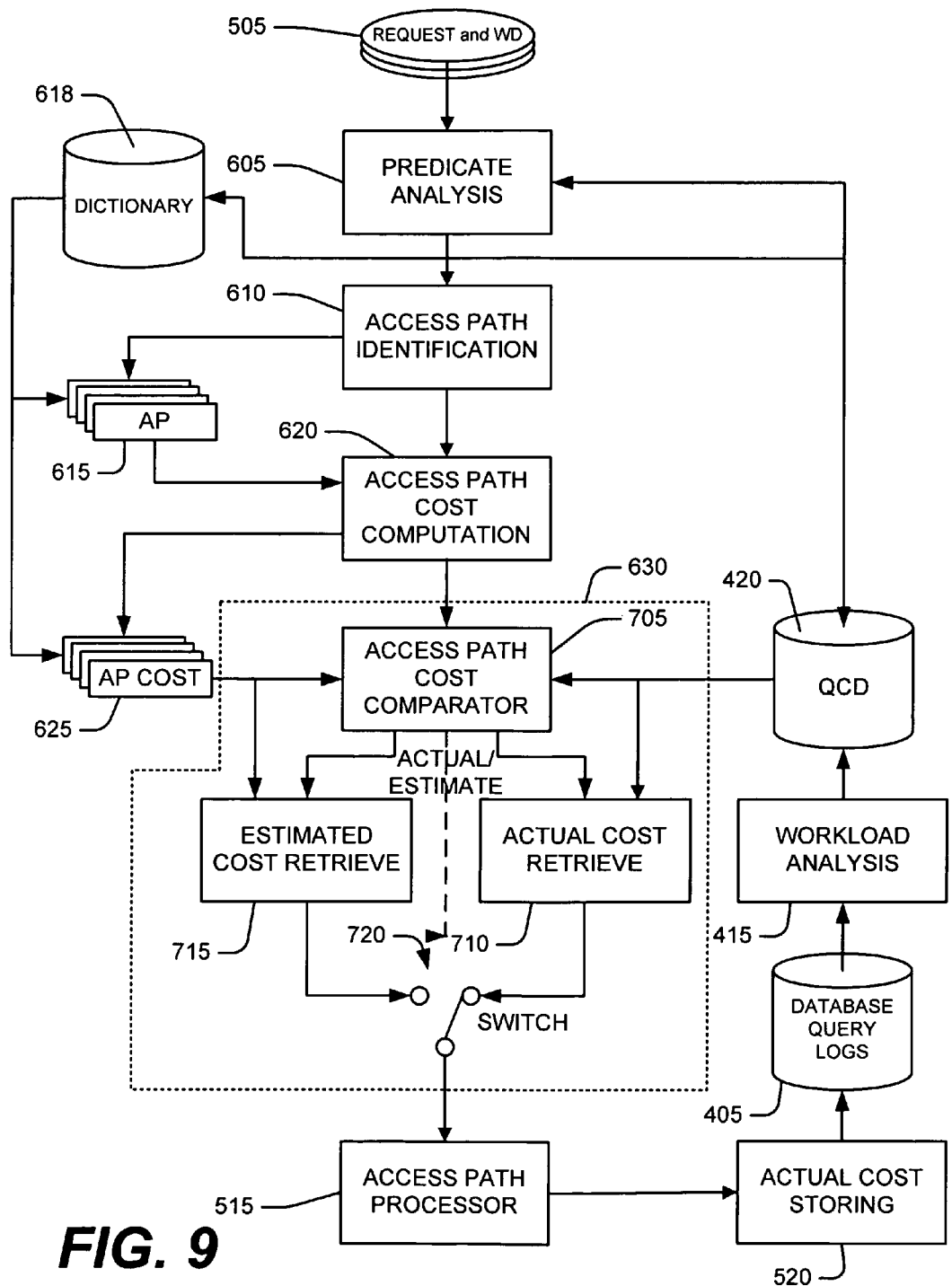
Figure 10:
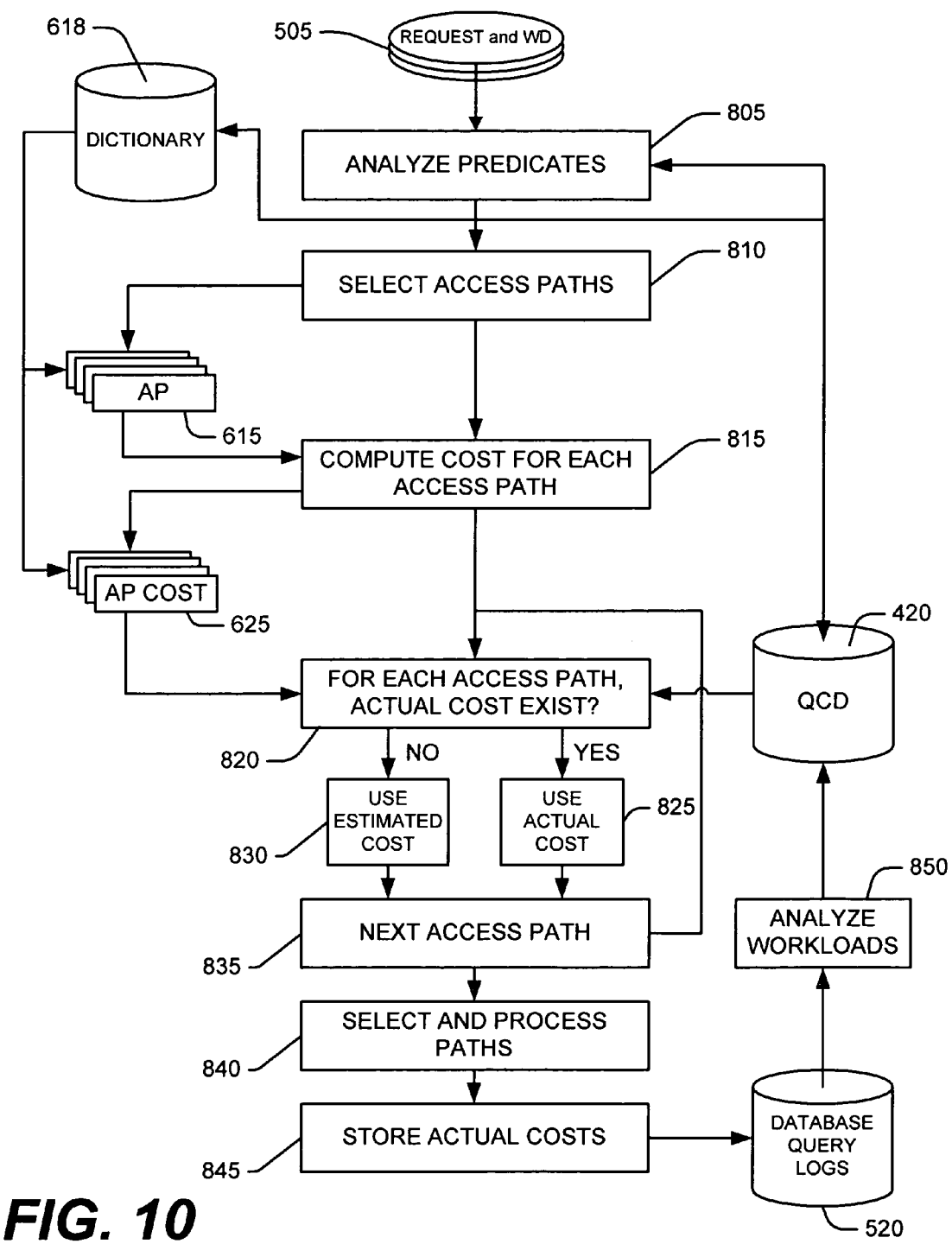

Two more feedback loops may be provided, as illustrated in FIGS. 9 and 10. The first loop (called a "predicate analysis loop") is created by allowing the predicate analysis block 605 to access the QCD 420. In that way, when pruning the list of predicates for which access path costs are to be computed, the predicate analysis block 605 can limit pruning to only those predicates for which costs may not be estimated and reliable actual costs are not available. In addition, in some example systems, the predicate analysis block 605 prepares an adjustment factor for each predicate that can be used to prepare future cost estimates. The adjustment factors are stored in the QCD 420.

Further, in some systems, a second loop (called the "data dictionary loop") is used to update the data dictionary using information from the QCD 420. This is in addition to the data dictionary updating process described in U.S. patent application Ser. No. 10/751,095, entitled "Database Object Access Statistics Collection," by Douglas P. Brown, filed on Dec. 31, 2005.

The predicate analysis loop and the data dictionary loop provide tools to repair incorrect statistics (e.g., statistics that are out-dated due to aging, growth or usage) and/or a mechanism to automatically create or drop secondary indexes in a real-time environment. In other words, the optimizer 320 can validate its estimate such that all statistics being used by the optimizer are known to be good statistics. This process employs the Teradata Index Wizard technology described in U.S. Pat. No. 6,801,903, entitled "Collecting Statistics in a Database," to Douglas P. Brown and Jeetendra Chaware, issued Oct. 4, 2004.

The predicate analysis loop and the data dictionary loop capture and use actual cardinalities, (value access frequencies, join predicate, spool cardinalities, etc.) and other operators analyzed from: database usage counts (i.e., access and usage frequencies); and database query log tables. This information is used to correct and adjust inaccurate cardinality estimates for the optimizer 320. In other words, information from the query logs 405 and QCD 420 is used to enhance the quality of the optimizer's cost model by correcting actual statistics (e.g., cardinality estimates).

This is done in the following major phases:

1. Optimizer plans and steps are captured using the query logs 405;
2. The execution of plans and steps are monitored using a 'threshold' option of the query logs 405 or workload definitions;
3. Join predicates are analyzed and actual versus estimated cardinalities for each step in a request are captured into the QCD 420;
4. Requests using a statistics-gathering syntax, such as the "insert explain into <QCD table> check statistics," are run to gather statistics into a QCD table.
5. Recommendations are made so the optimizer 320 can self adjust subsequent estimates for requests (i.e., access plans, join plans), or adjust database statistics for requests in a workload;
6. Database statistics are updated in the data dictionary; and
7. Candidate indexes are created or dropped based on usage and frequency indicators by request and/or workload definition.

This processing enhances the quality of the optimizer's estimates. In addition, it also may keep statistics up to date and accurate. Further, this processing may suggest where statistics gathering should be concentrated or even can suggest the need for additional statistics collection.

The predicate analysis loop helps detect database statistics problems, a non-limiting set of examples of which are listed below:

1. Detect out of date statistics—recognize tables with no rows and elect random sampling in the execution plan, ignoring the existence of possibly outdated statistics.
2. Recognize that a table has data, but statistics say the table is empty (likely meaning that the data in the table is out of date). In this case, it would be recommended that the predicate analysis block 605 issue an advisory and use samplings.
3. Recognize that the statistics are out of date or obsolete (either by growth, date usage, frequency, etc). Stale statistics are detected by sampling the data gathered as described, for example, in described in U.S. patent application Ser. No. 10/751,095, entitled "Database Object Access Statistics Collection," by Douglas P. Brown, filed on Dec. 31, 2005. Alternatively, the DBA may be prompted to collect statistics based on data in the query logs 405.
4. Recognize database usage statistics counts (i.e., access frequency counts and time stamps), gathered, for example, as described in described in U.S. patent application Ser. No. 10/751,095, entitled "Database Object Access Statistics Collection," by Douglas P. Brown, filed on Dec. 31, 2005, as indicators of good index candidates.

5. Recognize statistics and index usage frequencies and patterns for workload definitions recommending and adjusting data dictionary statistics or automatically dropping creating secondary indexes.

6. Recognizing large redistributions on partitions with nulls for which plans have statistics that indicate an empty table that is not empty or the table is empty but the statistics say otherwise.

7. Recognize large Cartesian product joins, large full table scans, etc.

Predicate analysis 605 can be performed in 'real-time' or in batch mode. Predicate analysis results are used to compute the value and join access cardinalities for the columns in the request. The analysis is done on a per-request basis or on a workload definition basis. The predicate analysis block 605 uses this information to compute and save the actual value/join cardinalities and access frequencies into the QCD 420 for further analysis. Another important function of the predicate analysis block 605 is to obtain the cardinalities and costs associated with the different columns of the tables or spool in a workload. It accomplishes this by monitoring previously executed requests, comparing the optimizer's estimates with actual(s) at each step in a query plan, and computing adjustments to cost estimates and/or statistics that may be used during future request optimizations. This analysis can be done either on-line or off-line on an emulated system and either incrementally or in batches. Some non-limiting examples of emulating databases are described in U.S. Pat. No. 6,738,756, entitled "Analysis Method and Apparatus for Parallel System," to Douglas P. Brown and Paul Sinclair, issued May 18, 2004.

Each request is considered a distinct entity for which the join/value access frequencies are collected. At a later stage, when the workload is being analyzed for feedback recommendations, these values are aggregated into net access frequencies per column based on the queries that are marked for predicate analysis. In other words, the most frequently used join predicates are most likely candidates for adjustment recommendations. In addition, usage frequencies and last-access timestamps are also considered as key indicators for statistic and index candidate recommendations. Further, the "insert explain into <QCD table> check statistics" request can be used to gather actual statistics into the QCD. Using this option, the system can fill the empty spots in the statistics available to the optimizer. A list of statistics recommendations, stored in the QCD database, is used by the access path comparator 705 to determine whether to use actual costs from the QCD or from the workload cache.

As described above, predicate analysis 605 involves scanning the requests for bind terms, range terms and the explicit terms in the term list of the request. A list of these terms is collected as each relation of the request is being processed. The predicate analysis block 605 builds a predicate list consisting of the different conditions (also known as terms) specified in the WHERE clauses of the request, which is later used by the recommendation phase of the predicate analysis.

When join predicates are being searched on a request, an anded term list is built for the request and used to compare against the captured steps in the query logs 405. The predicate analysis block 605 navigates the term list and extracts pertinent information from the query logs 405 for the captured bind, range and explicit predicates. The extracted information is put into a workload cache (not shown), the QCD 420, or data dictionary 618 tables so that optimizer 320 can process the recommendations in a later phase as described below.

By comparing the actual selectivity of the predicate with the estimated selectivity that was stored within the QCD 420, the predicate analysis block 605 calculates an adjustment factor such that the optimizer 320 can later compute the correct selectivity factor from the old estimate and the new adjustment factor. This adjustment factor is stored in the QCD 420 or put into an optimizer feed-back workload cache (not shown). Optionally the predicate analysis block 605 updates a statistics histogram in the data dictionary 618. If an automatic 'feed-back' mechanism is enabled, the optimizer 320 also constructs candidate plans during an access planning phase of the optimizer 320 by first retrieving the schema and statistics for each base table referenced in a request being processed from the QCD 420, feed-back cache, or data dictionary 618. If a match is found the optimizer retrieves the base-table cardinality and uses the adjusted selectivity factors for each predicate. At this point, if the predicate analysis loop is enabled, the optimizer 320 will also search a predicate analysis workload cache for any other adjustments (such as statistics) that may be relevant to the query, and adjust the base table statistics, predicate selectivity, and other statistics accordingly.

In one scenario, known as "corrected" or "adjusted" mode, this is accomplished without impacting the data dictionary tables.

With the predicate analysis loop and the data dictionary loop in place, the optimizer 320 is capable of self-adjusting and self-correcting by exploiting empirical results from actual executions of workloads (or workload definitions, such as, Tactical, Rush, High, Medium or Low workloads, etc.) or queries that can validate the optimizer's model incrementally, and calculate what part of the optimizer's model is in error. In other words, with the inclusion of these two loops, the optimizer is capable of computing correct adjustments for future estimates and to update statistics in the data dictionary 618 to be accurate for workloads and queries.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for optimizing processing of a request, the request having one or more predicates, the method including:

using a computer, creating a list of the one or more predicates in the request;

using a computer, pruning from the list of the one or more predicates for which an actual cost has not been stored or for which a cost cannot be estimated to produce a pruned list of predicates;

using a computer, selecting an access path for the each of the predicates in the pruned list of predicates;

using a computer, processing the request using the selected access paths, producing one or more actual predicate costs; and using a computer, storing the one or more actual predicate costs.

2. The method of claim 1 wherein selecting an access path for each of the predicates in the pruned list of predicates includes accessing a data dictionary, the method further including:
using a data dictionary when selecting the access path for each of the predicates in the pruned list of predicates; and
updating the data dictionary using the one or more actual predicate costs.

3. The method of claim 1 further including:
comparing the stored one or more actual predicate costs with an estimated predicate cost and calculating an adjustment factor that will be used to adjust the estimated predicate cost in future processing.

4. The method of claim 1 where selecting the access path includes:
using the actual predicate cost, if available, and otherwise using the estimated predicate cost.

5. The method of claim 1 where selecting the access path includes:
using the estimated predicate cost even if an actual predicate cost is available, if the actual predicate cost is unreliable.

6. The method of claim 5 where:
the actual predicate cost is unreliable if one or more of the following conditions is true:
the actual predicate cost is obsolete, or the actual predicate cost is empty.

7. The method of claim 1 where when pruning the predicate list:
the actual cost is accessed from the data dictionary.

8. The method of claim 1 where the request is associated with a workload and creating the list further includes:
including in the list predicates from other requests associated with the workload.

9. The method of claim 1 where pruning the list includes:
using actual statistics to determine the actual cost, if actual statistics are available; and
otherwise using estimated statistics to determine an estimated cost.

10. The method of claim 1 where pruning the list includes:
using sampled statistics to determine the actual cost, if sampled statistics are available; and
otherwise using estimated statistics to determine an estimated cost.

11. The method of claim 1 where pruning the list includes:
deriving the actual cost of the predicate or predicates in the list by running the predicate or predicates in the list through an optimizer and storing statistics produced by the optimizer in running the predicate or predicates.

12. A computer program, stored on a non-transitory computer-readable tangible storage medium, for use in optimizing processing of a request, the request having one or more predicates, the program including executable instructions that cause a computer to:
create a list of the one or more predicates in the request;
prune from the list the one or more predicates for which an actual cost has not been stored or for which a cost cannot be estimated to produce a pruned list of predicates;
select an access path for the each of the predicates in the pruned list of predicates;
process the request using the selected access paths, producing one or more actual predicate costs; and
store the one or more actual predicate costs.

13. The computer program of claim 12 wherein when selecting an access path for each of the predicates in the pruned list of predicates, the computer accesses a data dictionary, the program further including executable instructions that cause the computer to:
use a data dictionary when selecting the access path for each of the predicates in the pruned list of predicates; and
update the data dictionary using the one or more actual predicate costs.

14. The computer program of claim 12 further including executable instructions that cause the computer to:
compare the stored one or more actual predicate costs with an estimated predicate cost and calculate an adjustment factor that will be used to adjust the estimated predicate cost in future processing.

15. The computer program of claim 12 where, when selecting the access path, the computer:
uses the actual predicate cost, if available, and otherwise uses the estimated predicate cost.

16. The computer program of claim 12 where, when selecting the access path, the computer:
uses the estimated predicate cost even if an actual predicate cost is available, if the actual predicate cost is unreliable.

17. The computer program of claim 16 where:
the actual predicate cost is unreliable if one or more of the following conditions is true:
the actual predicate cost is obsolete, or the actual predicate cost is empty.

18. The computer program of claim 12 where when pruning the predicate list:
the actual cost is accessed from the data dictionary.

19. The computer program of claim 12 where the request is associated with a workload and, when creating the list, the computer further:
includes in the list predicates from other requests associated with the workload.

20. The computer program of claim 12 where, when pruning the list, the computer:
uses actual statistics to determine the actual cost, if actual statistics are available; and
otherwise uses estimated statistics to determine an estimated cost.

21. The computer program of claim 12 where, when pruning the list, the computer:
uses sampled statistics to determine the actual cost, if sampled statistics are available; and
otherwise uses estimated statistics to determine an estimated cost.

22. The computer program of claim 12 where, when pruning the list, the computer:
derives the actual cost of the predicate or predicates in the list by running the predicate or predicates in the list through an optimizer and storing statistics produced by the optimizer in running the predicate or predicates.

23. A database system including:
a massively parallel processing system including:
one or more nodes;
a plurality of CPUs, each of the one or more nodes providing access to one or more CPUs;

a plurality of data storage facilities, each of the one or more CPUs providing access to one or more data storage facilities;

a process for optimizing processing of a request, the request having one or more predicates, the process including:

creating a list of the one or more predicates in the request;

pruning from the list of the one or more predicates for which an actual cost has not been stored or for which a cost cannot be estimated to produce a pruned list of predicates;

selecting an access path for the each of the predicates in the pruned list of predicates;

processing the request using the selected access paths, producing one or more actual predicate costs; and storing the one or more actual predicate costs.

24. The database system of claim 23 where selecting an access path for each of the predicates in the pruned list of predicates includes accessing a data dictionary, the process further including:

using a data dictionary when selecting the access path for each of the predicates in the pruned list of predicates; and updating the data dictionary using the one or more actual predicate costs.

25. The database system of claim 23, where the process further includes:

comparing the stored one or more actual predicate costs with an estimated predicate cost and calculating an adjustment factor that will be used to adjust the estimated predicate cost in future processing.

26. The database system of claim 23 where selecting the access path includes:

using the actual predicate cost, if available, and otherwise using the estimated predicate cost.

27. The database system of claim 23 where selecting the access path includes using the estimated predicate cost even if an actual predicate cost is available, if the actual predicate cost is unreliable.

28. The database system of claim 27 where:

the actual predicate cost is unreliable if one or more of the following conditions is true:

the actual predicate cost is obsolete, or the actual predicate cost is empty.

29. The database system of claim 23 where when pruning the predicate list:

the actual cost is accessed from the data dictionary.

30. The database system of claim 23 where the request is associated with a workload and creating the list further includes:

including in the list predicates from other requests associated with the workload.

31. The database system of claim 23 where pruning the list includes:

using actual statistics to determine the actual cost, if actual statistics are available;

otherwise using estimated statistics to determine an estimated cost.

32. The database system of claim 23 where pruning the list includes:

using sampled statistics to determine the actual cost, if sampled statistics are available;

otherwise using estimated statistics to determine an estimated cost.

33. The database system of claim 23 where pruning the list includes:

deriving the actual cost of the predicate or predicates in the list by running the predicate or predicates in the list through an optimizer and storing statistics produced by the optimizer in running the predicate or predicates.

* * * * *